United States Patent
Chaudhary

(10) Patent No.: US 10,739,790 B2
(45) Date of Patent: Aug. 11, 2020

(54) CONTROL METHOD TO DAMP QUADROTOR SLUNG PAYLOAD MODE

(71) Applicant: The Boeing Company, Chicago, IL (US)

(72) Inventor: Ashwani K. Chaudhary, Cypress, CA (US)

(73) Assignee: The Boeing Company, Chicago, IL (US)

(*) Notice: Subject to any disclaimer, the term of this patent is extended or adjusted under 35 U.S.C. 154(b) by 1154 days.

(21) Appl. No.: 14/276,534

(22) Filed: May 13, 2014

(65) Prior Publication Data

US 2015/0331427 A1     Nov. 19, 2015

(51) Int. Cl.
*G05D 1/08* (2006.01)
*B64C 39/02* (2006.01)
*B64D 1/22* (2006.01)

(52) U.S. Cl.
CPC .......... *G05D 1/0858* (2013.01); *B64C 39/024* (2013.01); *B64D 1/22* (2013.01); *B64C 2201/027* (2013.01); *B64C 2201/128* (2013.01)

(58) Field of Classification Search
CPC .......... B64C 13/16; B64C 13/18; B64C 17/02; B64C 17/04; B64C 27/08; B64C 27/20; B64C 27/57; B64C 2201/024; B64C 2201/128; B64C 2201/141; B64D 1/08; B64D 1/22; B64D 9/00
See application file for complete search history.

(56) References Cited

U.S. PATENT DOCUMENTS 3,137,459 A * 6/1964 Smith ............... F41G 7/36
                                                244/192
5,788,186 A * 8/1998 White ............... B64C 1/22
                                                244/1 TD
9,146,557 B1 * 9/2015 Ahmed ............ G05D 1/0858
(Continued)

FOREIGN PATENT DOCUMENTS

EP       1146317 A1 * 10/2001  ......... B64C 27/006

OTHER PUBLICATIONS

Trajectory Generation for Swing-Free Maneuvers of a Quadrotor with Suspended Payload: A Dynamic Programming Approach; Ivana Palunko, Rafael Fierro, and Patricio Cruz; Marhes Lab, Electrical & Computer Engineering Department, University of New Mexico; Albuquerque, NM 87131, USA.

(Continued)

*Primary Examiner* — Christopher D Hutchens
(74) *Attorney, Agent, or Firm* — Miller, Matthias & Hull LLP

(57) ABSTRACT

A quadrotor or other vertical lift aerial vehicle measures an angle of a payload slung from the quadrotor relative to a body of the quadrotor. Using this measurement a signal may be generated that adjusts a flight characteristic of the quadrotor to counteract swing in the payload. A feedback function for generating the feedback signal may include proportional and derivative gain functions as well as non-linear signal processing functions. The feedback signal may be added to normal input control signals to cause acceleration in the direction of the payload angle that damp oscillation of the slung payload caused by wind or movements of the quadrotor.

16 Claims, 10 Drawing Sheets

(56) References Cited

U.S. PATENT DOCUMENTS

| | | | |
|---|---|---|---|
| 2011/0084162 A1* | 4/2011 | Goossen | B64C 39/024 244/12.1 |
| 2013/0054054 A1* | 2/2013 | Tollenaere | G05D 1/0858 701/3 |
| 2014/0114505 A1* | 4/2014 | Hagerott | B64C 19/00 701/3 |

OTHER PUBLICATIONS

Generic Slung Load Transportation System Using Small Size Helicopters; Markus Bernard, Konstantin Kondak; Real-Time Systems and Robotics Technische Universitat Berlin Einsteinufer 17/EN10, Berlin 10587; 2009 IEEE International Conference on Robotics and Automation Kobe International Conference Center; Kobe, Japan; May 12-17, 2009; pp. 3258-3264.

Adaptive Control System for Autonomous Helicopter Slung Load Operations; Morten Bisgaard, Anders la Cour-Harbo, Jan Dimon Bendtsen; Department of Electronic Systems, Aalborg University; 9220 Aalborg East, Denmark; Jan. 27, 2010; pp. 1-14.

Simulation of the Dynamics of Helicopter Slung Load Systems; Luigi S. Cicolani, Gerd Kanning, Robert Synnestvedt; Ames Research Center; Moffett Field, California; Oct. 1995; pp. 44-61.

Robust Regulation of a Flying Crane; D. Faille, A.J.J. van der Weiden; Electricite de France, Direction des Etudes et Recherches 6 Quai Watier, 78400 Chatou, France; Mechanical Engineering Systems and Control Group, Delft University of Technology; Mekelweg 2, 2628 CD Deft, The Netherlands; 1995 IEEE; pp. 494-499.

New Fuzzy-Based Anti-Swing Controller for Helicopter Slung-Load System near Hover; Hanafy M. Omar; Aerospace Engineering Department, King Fand University of Petroleum & Minerals, Dhahran, Saudi Arabia.

\* cited by examiner

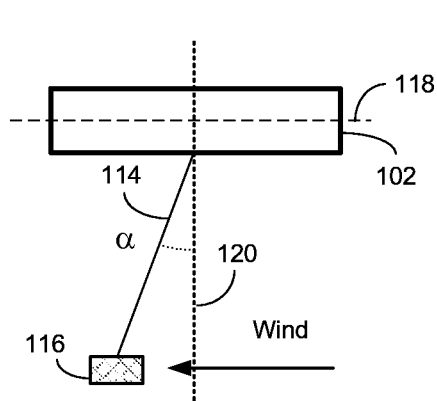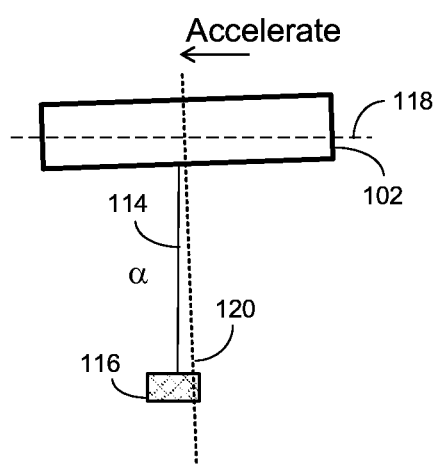
Fig. 3A        Fig. 3B
Fig. 3

350

CONTROL METHOD TO DAMP QUADROTOR SLUNG PAYLOAD MODE

FIELD

This disclosure relates to a quadrotor aerial vehicle and more particularly to damping a slung payload being lifted by the quadrotor.

BACKGROUND

Quadrotor aerial vehicles, also known as quadcopters, have been in use since the 1920's but were generally disregarded due to poor lifting performance and poor stability. In recent years, quadrotors have experienced a resurgence due to improvements in materials including high strength, light weight composites and improved battery technology.

Application of quadrotors to seemingly simple tasks such as transporting materials in a sling can be limited by instabilities caused by wind, wind gusts, and the acceleration of the quadrotor. In similar applications, such as helicopter lifts, a human pilot can manually counter the effects of a swinging payload. However, even in a piloted vehicle controlling a swinging payload is not a simple task. The challenge is increased for an automatically piloted aerial vehicle when such visual and tactile inputs may not be available. Oscillatory motion in a payload can quickly develop into a situation where the quadrotor's efficiency is reduced or may even become uncontrollable.

Attempts to predict and prevent slung payload oscillation have used a variety of techniques including predicting flight characteristics of the payload and feed-forward only predictions of trajectory of the payload based on a flight path of the lift vehicle. However, these techniques rely on predictive techniques and/or modeling of the load that may not always accurately portray the actual circumstances. Thus, there is a need for a way to quickly identify and correct oscillatory conditions in a slung payload of a quadrotor.

SUMMARY

In one aspect of the disclosure, a method of controlling a payload angle of a payload that is slung from an aerial vehicle, such as a quadrotor may include determining an angle of the payload relative to a body of the aerial vehicle and generating an adjustment command corresponding to the angle of the payload. In an embodiment, the payload angle is measured as orthogonal angles in an x-direction aligned with a pitch of the aerial vehicle and a y-direction aligned with a roll of the aerial vehicle. The method may also include applying the adjustment command to cause a change of a pitch angle and/or a roll angle of the aerial vehicle so that the aerial vehicle accelerates in a direction of the angle of the payload.

In another aspect of the disclosure, an aerial vehicle, such as a quadrotor is configured to damp oscillation of a payload that is slung from the aerial vehicle. The aerial vehicle may include a body having lift elements, such as rotors, a payload attachment configured to attach the payload and may also include a payload coupled to the payload attachment. The aerial vehicle may include a controller configured to measure an angle of the payload relative to the body and, responsive to the angle of the payload, adjust an orientation of the body in a direction of the angle of the payload.

In yet another aspect of the disclosure, a quadrotor may be configured to automatically compensate for angle changes of a payload that is slung from the quadrotor. The quadrotor may include four lift rotors, a body coupling the four lift rotors, a payload attachment and a controller. The controller may be use computer executable instructions to measure an angle of the payload relative to a plane through the four lift rotors, and when a threshold condition is present, generate an adjustment command responsive to the angle of the payload. The application of the adjustment command to an input control signal of the quadrotor may cause the quadrotor to accelerate in a direction of the angle of the payload and damp oscillatory movement of the payload.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIGS. 3A and 3B are illustrations of an aerial vehicle in other attitudes with respective payload angles;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

In order to address oscillatory motion in a slung payload, a quadrotor or other vertical lift platform may sense both an angle and rate of change of the angle in two dimensions to develop an adjustment command that is combined with regular motion control commands in order to damp the oscillatory motion. The use of actual angle eliminates the need to characterize the payload in terms of weight, aerodynamic shape, length of the tether, or the elasticity of the tether. Further, the use of the angle measurement in combination with feedback and feedforward loops in the control process eliminates the need to predict the effect of movement of the quadrotor on the payload. Thus, the effect of wind or wind gusts on a payload slung from a stationary quadrotor are dealt with as effectively as when the quadrotor is in motion.

Figure 1:
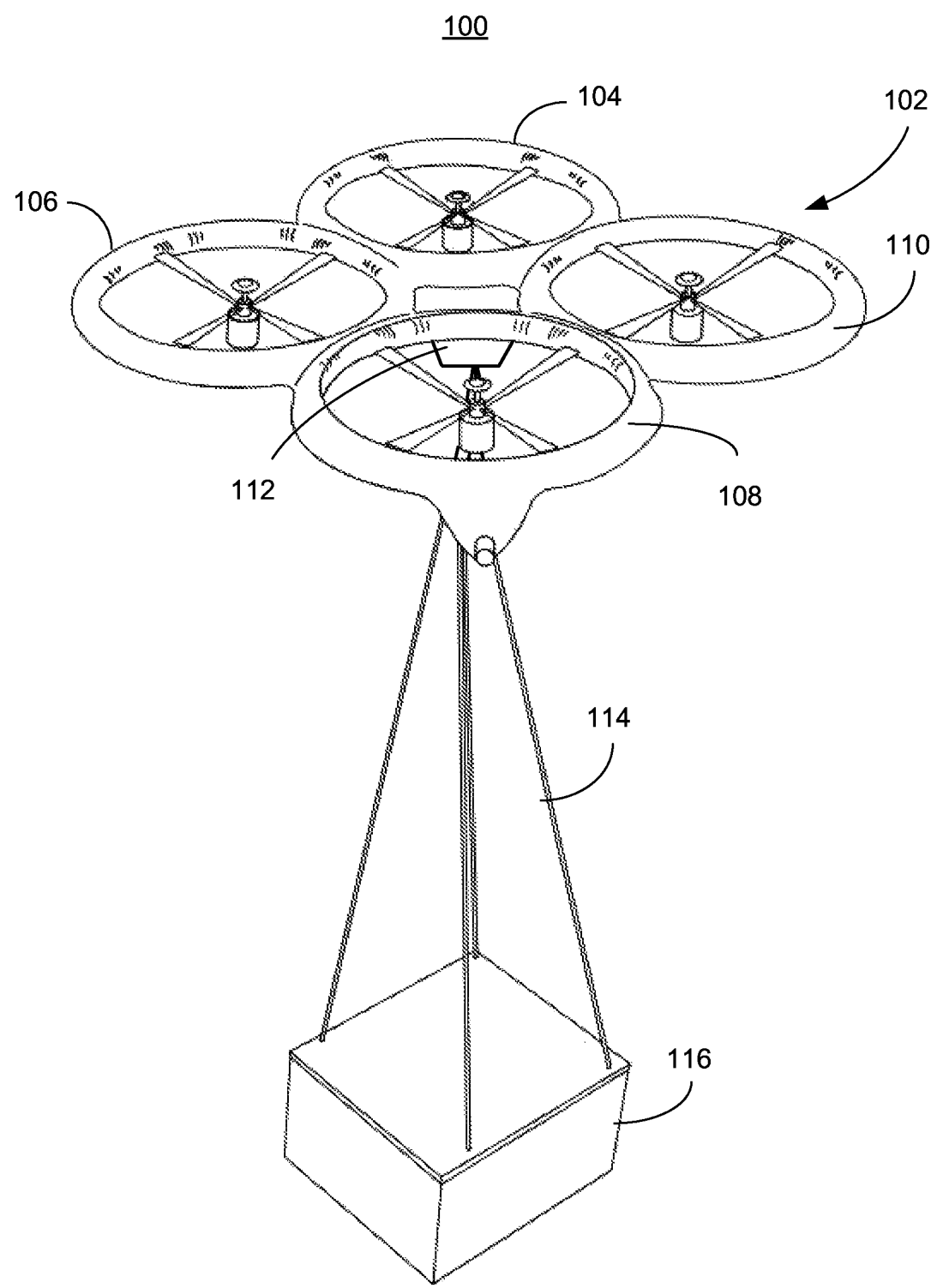
FIG. 1 is an illustration of an aerial vehicle with a payload slung from the aerial vehicle.

FIG. 1 illustrates an exemplary aerial lift environment 100 including a quadrotor 102 and a payload 116 that is slung from the quadrotor 102 by one or more tethers 114, such as guy ropes or wires. The quadrotor 102 may include four rotors 104, 106, 108, 110 and may also include a control module 112. The control module 112 may include a processing unit, radios for communication with a ground station, sensors including accelerometers, cameras, location devices such as a global positioning system (GPS) receiver, etc. The quadrotor 102 may also include one or more battery packs (not depicted).

While a quadrotor 102 is used for illustration, the following discussion applies equally to other manned and unmanned aerial vehicles including, but not limited to, helicopters and other configurations of rotorcraft including aerial vehicles with fewer or more than four rotors.

Figures 2A, 2B, 2C:
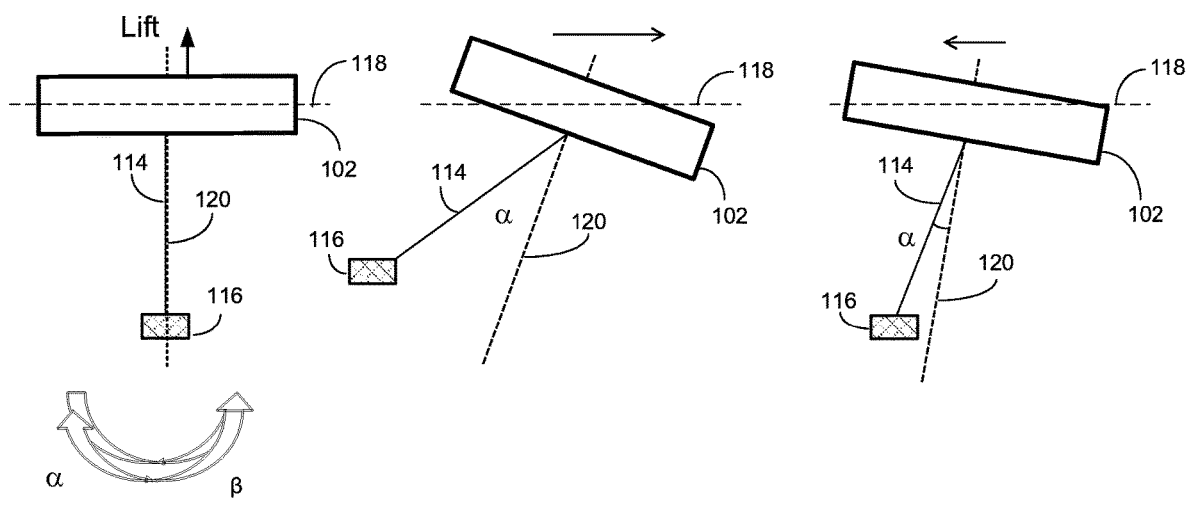
FIGS. 2A, 2B and 2C are illustrations of an aerial vehicle in various attitudes and respective payload angles.

FIGS. 2A-2C are illustrations of the quadrotor 102 in various attitudes and payload angles. FIG. 2A illustrates the quadrotor 102 oriented straight and level versus a horizon 118. A long dimension of the quadrotor 102 is defined as a body dimension parallel to the horizon when the aerial vehicle is oriented straight and level with the horizon. The tether 114 coupled between the payload 116 and the quadrotor 102 is in alignment with a reference 120 perpendicular to the quadrotor 102. The angle between the tether 114 and the reference 120 can be expressed in any of a number of ways, including both Cartesian and polar coordinates. For ease of illustration, the following discussion uses payload angles expressed in two terms, α representing a payload angle in one direction relative to the reference 120 and β representing a payload angle orthogonal to α. While not strictly necessary, coordinate systems may be defined for payload angle and for the quadrotor controls so that the angle α is aligned with a pitch, θ, of the quadrotor and is β is aligned with a roll, φ, of the quadrotor. By selecting the coordinate systems in this manner, any complex motion of the payload can be reduced to orthogonal components corresponding to either the pitch or the roll of the quadrotor 102.

FIG. 2B illustrates the quadrotor 102 at an angle with respect to the horizon 118 such that the quadrotor 102 is in motion. The tether 114 coupling the payload 116 to the quadrotor 102 is at an angle α with respect to the reference 120. The angle α may have been developed during an initial acceleration of the quadrotor 102, as a result of wind, or both. The payload 116 may or may not have an oscillatory component such that the angle α is periodically increasing and decreasing.

FIG. 2C illustrates that a negative acceleration of the quadrotor 102, for example, from 10 miles per hour (mph) to 9.7 mph will maintain the forward motion of the quadrotor 102 and payload 116 but can effectively reduce the angle α between the tether 114 and the reference 120 and reduce or eliminate oscillatory motion, as discussed more below.

Figure 11:
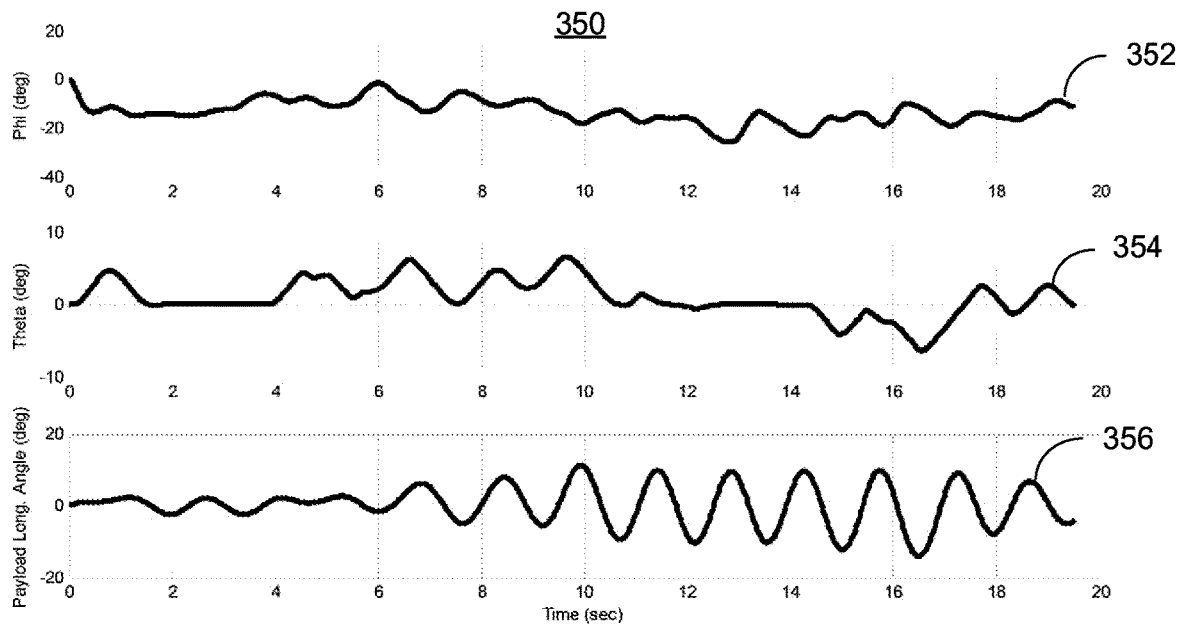
FIG. 11 is an illustration of payload angle and input command angles using an undamped control scheme.

FIGS. 3A and 3B illustrate the quadrotor 102 in other attitudes. In FIG. 3A the quadrotor 102 is shown flying straight and level with respect to the horizon 118. However, an impulse, such as a wind gust, is shown to have created an angle α between the tether 114 in the reference 120. When the gusts dies, the payload 116 will begin an oscillatory motion. Turning briefly to FIG. 11, a chart 350 illustrates an effect of an impulse on the stability of the quadrotor absent any damping. Motion in the payload 116 may cause the quadrotor to move out of position, causing the control module 112 of the quadrotor 102 to apply pitch 354 and roll 352 commands to maintain its position. The cumulative effect of the motion of the quadrotor 102 can be seen in the longitudinal (α) payload angle 356 that increases over time to, in this simulation, as much as +/−15 degrees or more.

Figure 12:
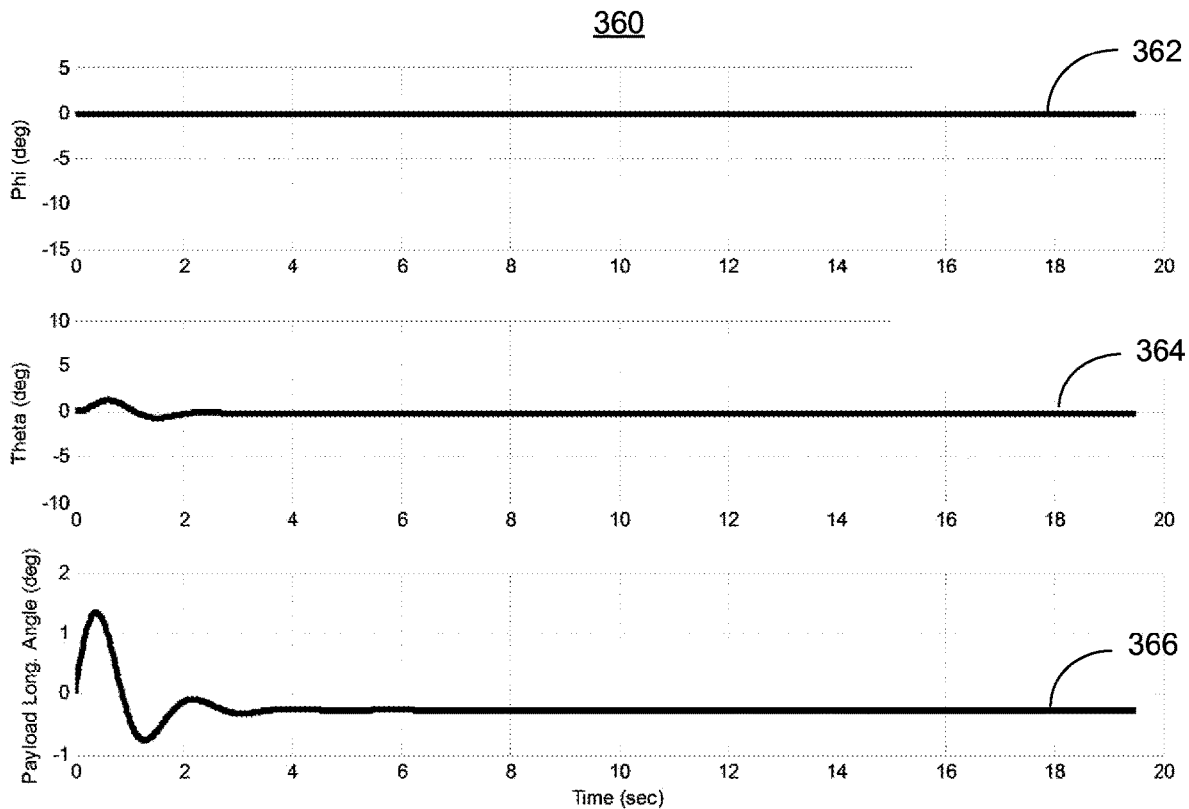
FIG. 12 is an illustration of payload angle and input command angles using an exemplary control process in accordance with the current disclosure.

FIG. 3B illustrates an acceleration of the quadrotor 102 in the direction of the angle of the payload resulting in a reduction of the angle α. Turning briefly to FIG. 12, a chart 360 illustrates another simulated impulse to the payload 116 as shown in FIG. 11 in the α direction. (The scale of payload angle 366 is increased compared to FIG. 11.) Due to the damping, adjustments to the pitch, θ, of the quadrotor 102 responsive to the payload angle and rate of change of the payload angle effectively damps the payload swing in a few seconds with little or no impact on the roll, φ, of the quadrotor 102.

Figure 4:
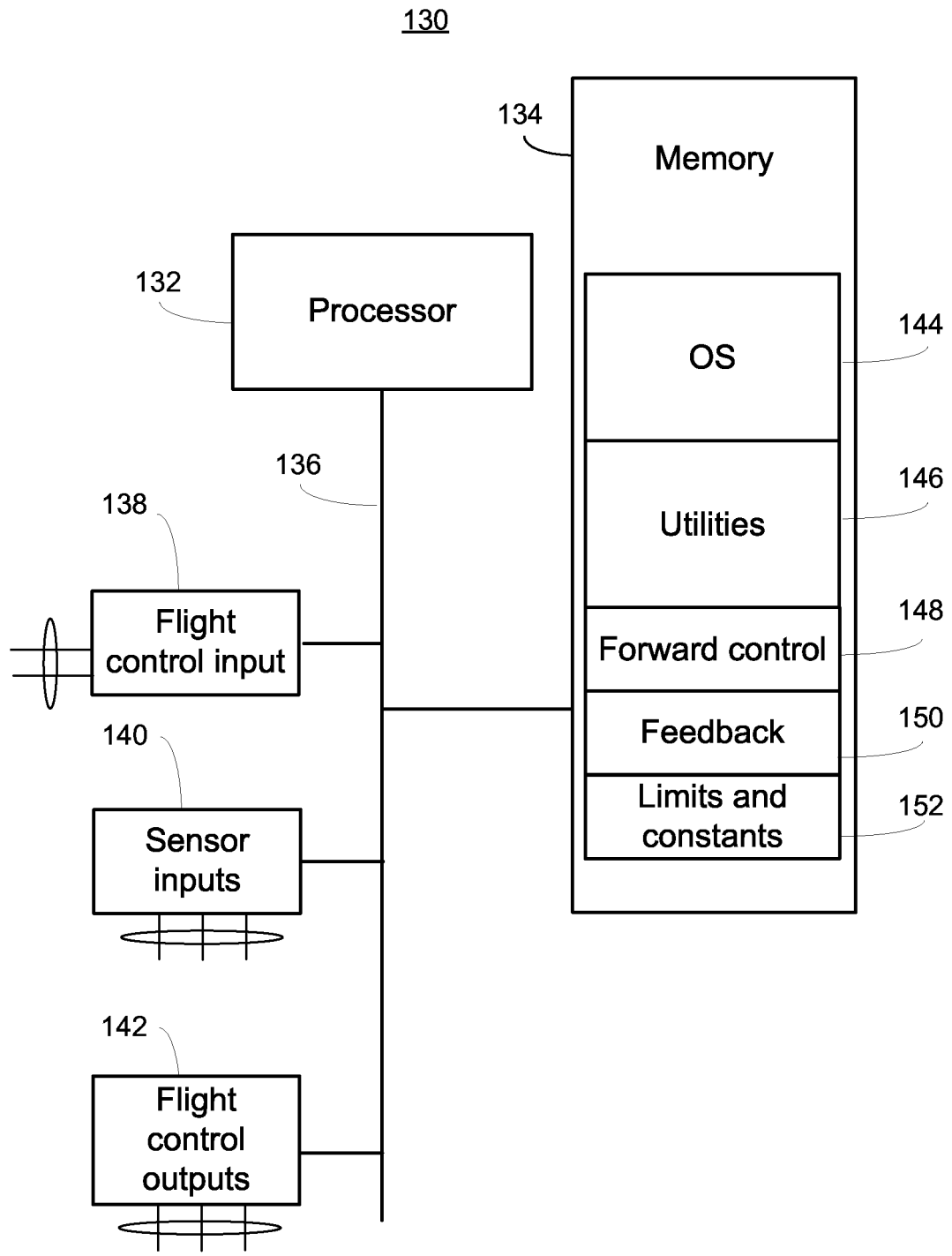
FIG. 4 is an illustration of an exemplary processing unit for use in the illustrated aerial vehicle.

FIG. 4 is an illustration of an exemplary processing unit 130 that may be a component of the control module 112. The processing unit 130 may include a processor 132 and a memory 134 coupled by a bus 136. The memory 134 may include a random access memory (RAM) and a read-only memory (ROM) utilizing memory technologies including, but not limited, to silicon-based technologies, bubble memory, optical media, organic memory, nano technologies, etc. The memory 134 may also include a mass storage device, data memory, and/or on a removable storage medium such as a flash memory device. The memory 134 does not include propagated media such as a carrier wave.

Also coupled to the bus 136 may be a flight input control 138 that receives signals via direct manipulation or via a radio receiver, an optical receiver, etc. Various sensor inputs 140 may also be coupled to the bus 136 and may include inputs coupled to location sensors, proximity sensors, accelerometers used for orientation sensing, angle encoders for determining the tether angles α and β relative to the reference 120, cameras, battery sensors, etc. The processing unit 130 may also include flight output controls 142 used to manage lift at each rotor 104, 106, 108, 110 for use in controlling the pitch and roll of the quadrotor 102.

The memory 134 may include computer-executable instructions that implement an operating system 144 and utilities 146 used in a conventional manner for memory management, diagnostics, communications, etc. Additional computer-executable instructions may implement modules such as a forward control module 148 and a feedback module 150, as well as constants, thresholds, and limits 152 that may be used for different models of quadrotor 102 or for various operating modes for a particular model of quadrotor 102. While the exemplary embodiment illustrated is depicted as using computer instructions that are executed on the processor 132, other implementations of the control process discussed below may be supported, for example, using programmable logic arrays (PLA), distributed processing, remote processing via high-speed data connections, neural networks, or other techniques.

Figure 5:
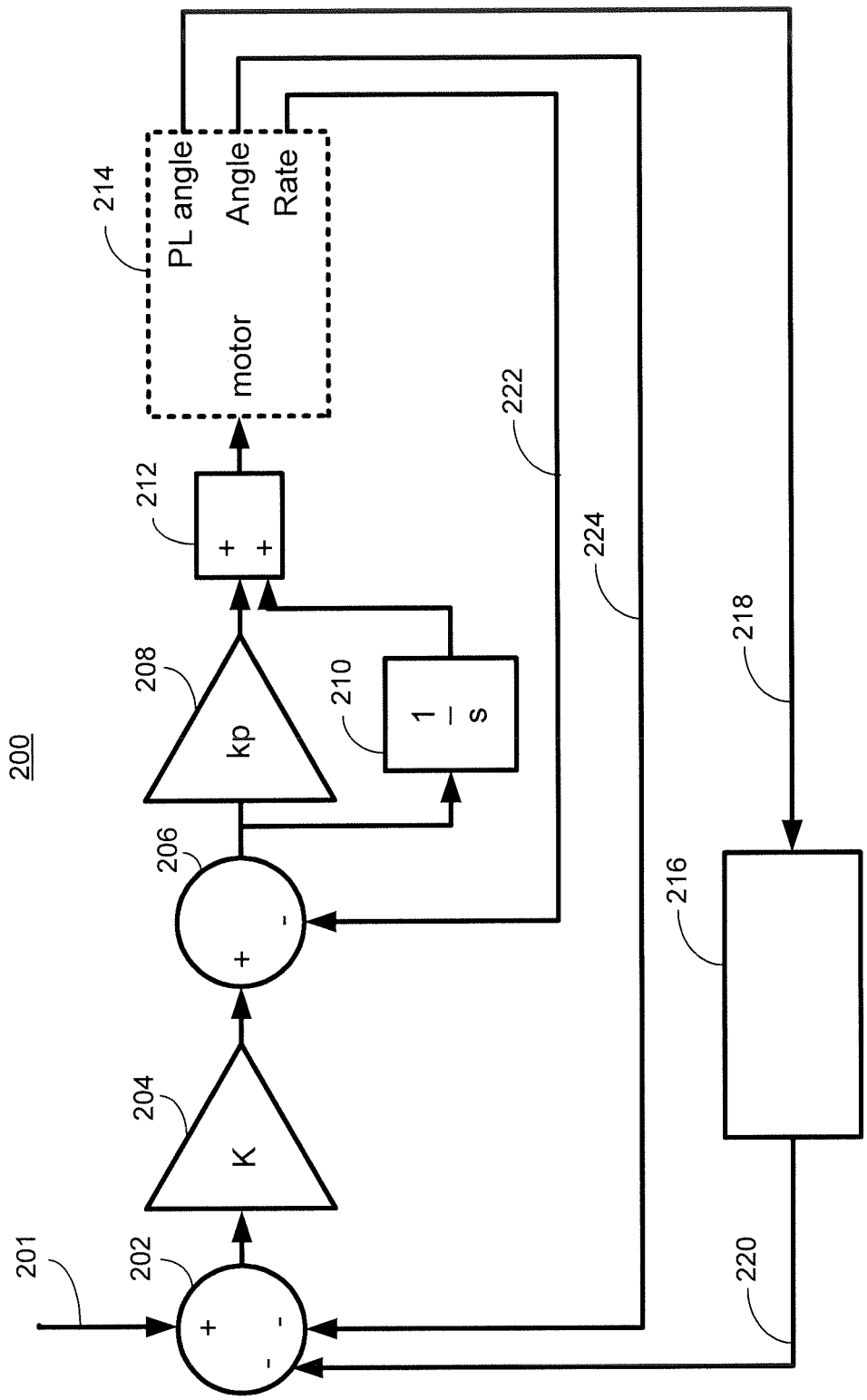
FIG. 5 is a block diagram of an exemplary embodiment of a control process implemented on the controller of FIG. 4.

FIG. 5 is a block diagram of an exemplary embodiment of a control process 200 implemented via the processing unit 130. The control process 200 is one of two separate, identical, control processes, one applied to pitch, θ, in the other applied to roll, φ using respective payload angles α and θ. A summing function 202 receives control input 201 and combines the control input 201 with feedback signals discussed below. A gain function 204 amplifies the resulting output of the summing function 202. Another summing function 206 adds additional feedback and provides an output to another gain function 208 and an integrator function 210. The output of the gain function 208 and integrator function 210 are combined at an adder 212 and provide a motor control output via flight output controls 142 to a motor associated with one of the rotors 104-110 that is external to the control module 112, illustrated by functional block 214. The functional block 214 may provide, via sensor inputs 140, a payload angle signal 218 corresponding to a payload angle, an angle 224 of the quadrotor 102 and a rate (angle change rate) 222 of the quadrotor 102. The loop gain settings at gain functions 204 and 208 set the control sensitivity while the angle and rate feedback signals 224 and 222 respectively are used as negative feedback to provide stability to the quadrotor 102. A feedback function 216 takes the payload angle signal 218 and generates a correction signal 220 that is combined at the summing function 202 to accomplish acceleration of the quadrotor 102 in the direction of the payload angle, as discussed further below.

Figure 6:
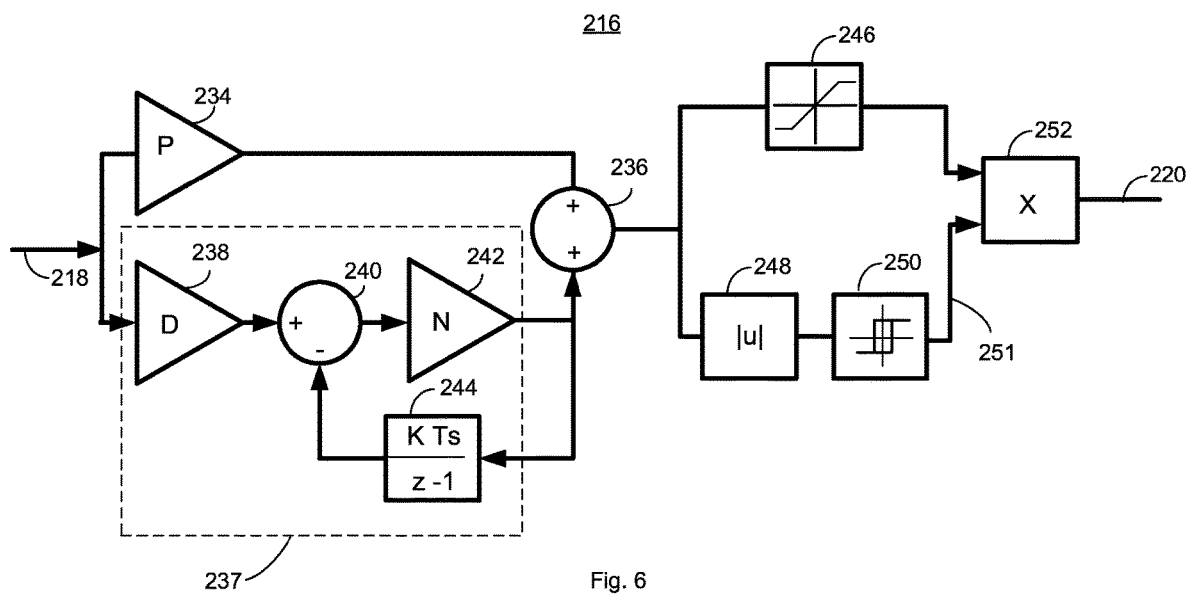
FIG. 6 is a block diagram of illustrating an embodiment of a portion of the control process of FIG. 5.

FIG. 6 is a block diagram illustrating an embodiment of a portion of the control process of FIG. 5, more specifically, the feedback signal processing of feedback function 216. Recalling that the control processes illustrated in FIG. 5 and FIG. 6 are duplicated for each payload angle measurement, a payload angle signal 218 may carry either the $\alpha$ payload angle or the $\beta$ payload angle as supplied by functional block 214. The payload angle signal 218 may be split and fed to a proportional gain function 234 and a derivative function 237. At derivative function 237 the payload angle signal 218 may be fed to a derivative gain function 238. The output of the derivative gain function 238 may be combined with an output of a delay filter 244 and fed to a filter coefficient function 242.

In an embodiment, the loop time may be in a range between 50 Hz and 150 Hz that is Ts may be in a range from about 0.006 seconds to about 0.02 seconds. In another embodiment, the loop time may be in a range between 90 Hz and 110 Hz, that is Ts may be in a range from about 0.009 seconds to about 0.01 seconds, although other loop times may be appropriate for different sizes of quadrotor 102 and/or different expected load ranges. The outputs of the proportional gain function 234 and the filter coefficient function 242 may be added at summing function 236.

Figure 9:
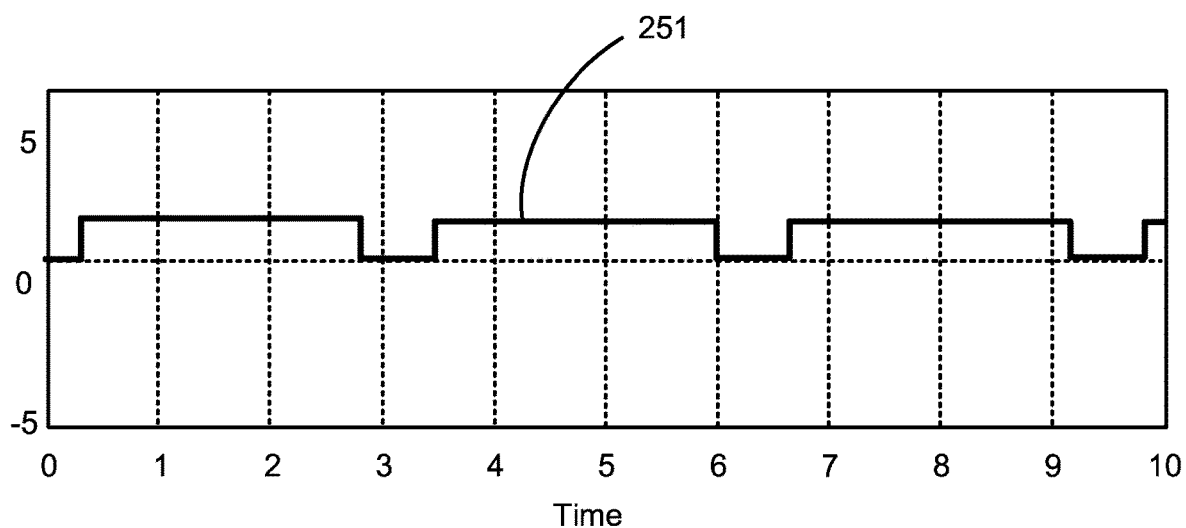
FIG. 9 is a detail of an intermediate signal of the embodiment of FIG. 6.

The output of the summing function 236 may be sent to a sign function 246 with an output of either +1 or −1 based on the polarity of the payload angle signal 218. The output of summing function 236 may also be sent to an absolute value function 248 and a relay function 250. The relay function 250 creates a "null-control zone" and is set to allow its output to track the input, depending on two specified set points. When the relay is off, the output signal at line 251 is zero and when the relay is on, the output signal at line 251 is 1. In an embodiment, a first set point or 'on' threshold angle may be, for example, 2 degrees, while the 'off' threshold angle may be 1.9 degrees. These values are purely for the purpose of illustration and other threshold angles may be chosen depending on the type of quadrotor 102 and the expected load. Referring briefly to FIG. 9, the signal at line 251 is illustrated. It shows that the output of the relay function 250 is either a logical 1 or a logical zero. In a purely analog configuration, the output may be zero volts or one volt.

A saturation function 246 is a function that caps the magnitude of the adjustment command to a output signal that is equivalent to a saturation threshold angle. In an embodiment, the saturation function 246 may have the positive saturation threshold angle set in a range of 35 degrees to 45 degrees and a negative saturation angle set in a range of −35 degrees to −45 degrees. To illustrate using a ±40 degree saturation threshold angle, if the payload angle $\alpha$ goes to +60 degrees, the output of the relay function 250 may be set to a value corresponding to a payload angle $\alpha$ of +40 degrees. All angles less than the saturation threshold angle will be passed through unaltered. This may help prevent overcorrection that might cause instability in the quadrotor 102 should the operating environment include, for example, large wind gusts or tampering with a payload. In an embodiment, the saturation function 246 may be set to unity so that any input angle is passed to the multiplication function 252. Put another way, the saturation threshold angle may be set to ±90 degrees to pass all angle values to the multiplication function 252.

Figure 10:
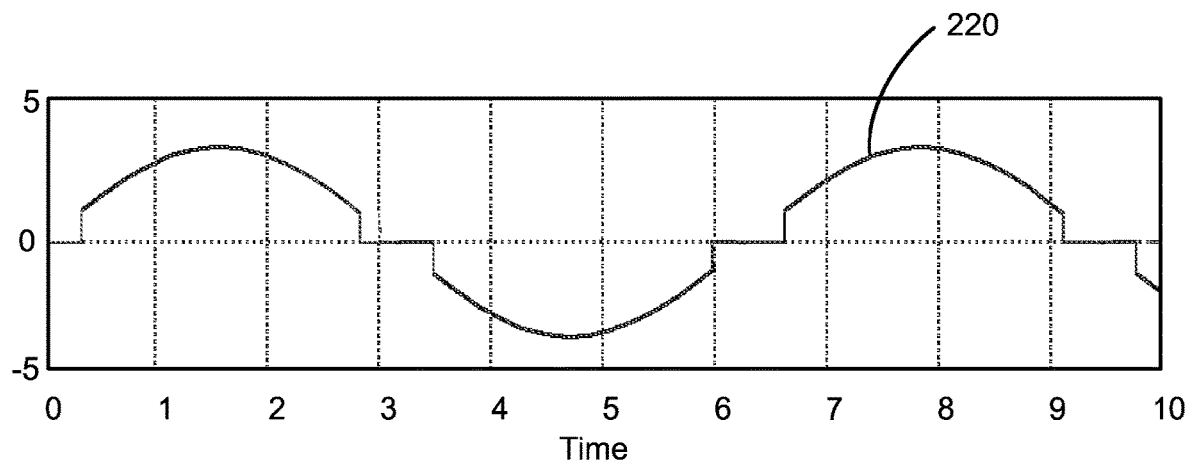
FIG. 10 is a detail of an output signal of the embodiment of FIG. 6.

The output of the relay function 250, a 1 or 0, may be multiplied by the output of the saturation function 246 at multiplication function 252 and the resulting correction signal 220 fed back to the summing function 202 as negative feedback to either a pitch command or a roll command, depending on to which angle the instance of the control process is directed, $\alpha$ or $\beta$. Turning briefly to FIG. 10, a representative signal on line 220 at the output of the multiplier 252 is illustrated. Whenever the relay function is off, the output is zero. When the relay is on, the output follows the signal at the output of the saturation function 246, illustrated as a sine wave.

In summary, the feedback function 216 takes a payload angle and processes it such that the control input 201 is adjusted to cause the quadrotor 102 to accelerate in the direction of the payload angle. The proportional nature of the feedback signal increases the feedback signal as the payload angle increases and the derivative nature of the feedback signal comprehends the changes in speed of the payload as it travels through an oscillation cycle.

In an embodiment, the payload angle signal 218 may be half wave rectified before processing so that the quadrotor 102 only applies damping signals to payload angles on one side of the reference 120. This may reduce the processing overhead required to calculate the correction signal 220, potentially saving power and improving battery life and even allowing the use of a lower cost processor 132, potentially saving on product cost. The time to damp an oscillation may be extended but depending on the application, it may be considered a worthwhile trade-off in light of the benefits.

Figure 7:
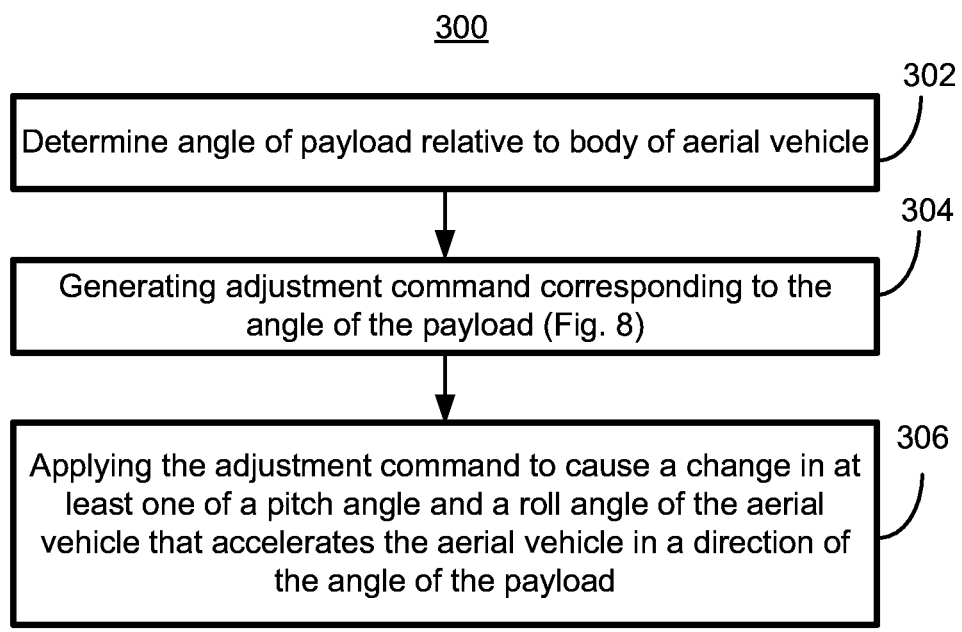
FIG. 7 is an illustration of operations performed by one embodiment of the control process.

FIG. 7 is an illustration of operations 300 performed by one embodiment of the control process 200. At a block 302, an angle of the payload relative to the body of the aerial vehicle may be determined. As discussed above, the angle of the payload may be captured as a $\alpha$ angle aligned with a pitch direction of the quadrotor 102 and as a $\beta$ angle aligned with a roll direction of the quadrotor 102.

At a block 304, an adjustment command corresponding to the angle of the payload may be generated as discussed above and as will be discussed in more detail respect to FIG. 8. At a block 306, the adjustment command may be applied to a control input command to cause a change in at least one of a pitch angle or a roll angle of the quadrotor 102 so that quadrotor 102 is accelerated in a direction of the angle of the payload.

Figure 8:
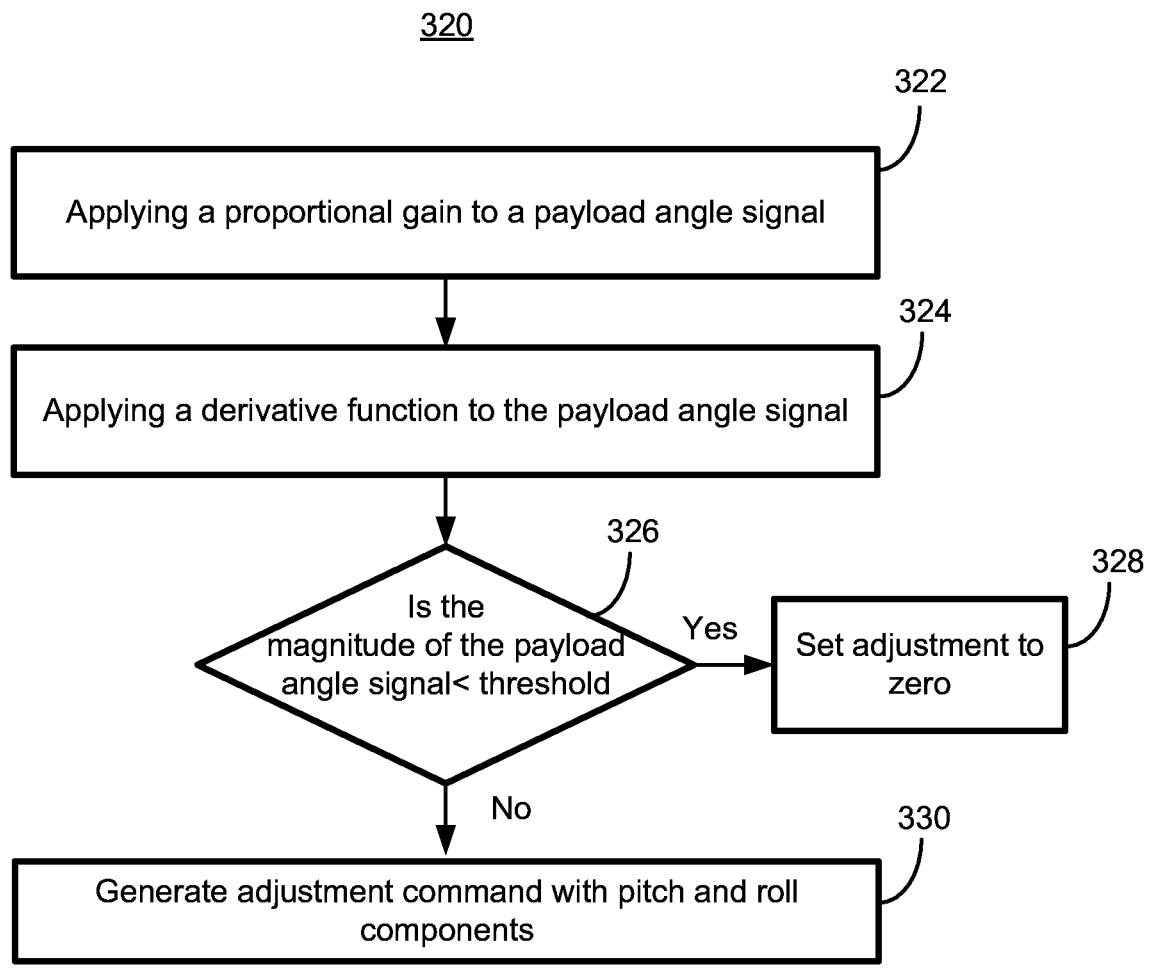
FIG. 8 is a detail of the operations illustrated in FIG. 7.

FIG. 8 is a detailed illustration 320 of the operation of block 304 illustrated in FIG. 7. To generate the adjustment command that is applied to the control input command, at a block 322, a proportional gain function 234 is applied to the payload angle signal 218. At a block 324, a derivative gain function 238 is applied to the payload angle signal 218. In an embodiment, the derivative function may also include a delay filter 244 fed back to an output of a derivative gain function 238.

At block 326, a determination may be made as to whether the payload angle, represented by the absolute value of an intermediate signal at relay function 250 is below a threshold angle. As discussed above, in an embodiment, the threshold angle may be in a range of 2 degrees to 4 degrees. Other threshold angles may be applied depending on the operating environment. Because the signal at relay function 250 of FIG. 6 incorporates not only an absolute angle component, but a rate of change component, there may be circumstances where even though the angle value itself is within the threshold range, a rate of change of payload angle may cause the intermediate signal to meet or exceed the threshold requirement.

If, at block 326, the magnitude of the payload angle is below the threshold value, the 'yes' branch may be taken to block 328 and the adjustment command may be set to zero, so that no changes are made to the input control signal.

If, at block 326, the magnitude of the payload angle is at or below the threshold value, the 'no' branch may be taken to block 330. The correction signal 220 may be applied via the summing function 202.

A quadrotor 102 using the payload damping system and method described above benefit the operator of such a system by developing smoother flight paths and more predictable routes. The in-flight corrections reduce the control signal bandwidth requirements with a ground station by making the acceleration adjustments transparently to operator signals. Better payload stability may also result in more accurate drop placements and better use of target space.

While only certain embodiments have been set forth, alternatives and modifications will be apparent from the above description to those skilled in the art. These and other alternatives are considered equivalents and within the spirit and scope of this disclosure and the appended claims.

What is claimed:

1. A method of controlling a payload angle of a payload that is slung from an aerial vehicle comprising:
   determining an angle of the payload relative to a body of the aerial vehicle;
   ignoring the angle of the payload when the angle is less than a threshold angle in a range of three to five degrees;
   generating an adjustment command corresponding to the angle of the payload when the angle is greater than the threshold range of three to five degrees; and
   applying the adjustment command to cause a change in at least one of a pitch angle of the body and a roll angle of the body that accelerates the aerial vehicle in a direction of the angle of the payload.

2. The method of claim 1, wherein generating the adjustment command comprises:
   applying a proportional gain function to the payload angle;
   applying a derivative function to the payload angle, the derivative function including a delay filter fed back to an output of a derivative gain function; and
   generating the adjustment command including a first modification to at least one of an aerial vehicle pitch command and a second modification to an aerial vehicle roll command.

3. The method of claim 2, wherein the payload angle is half-wave rectified prior to applying the proportional gain function and applying the derivative function.

4. The method of claim 1, wherein applying the adjustment command comprises adding the adjustment command to an existing control input signal of the aerial vehicle.

5. The method of claim 1, wherein the aerial vehicle is a quadrotor.

6. An aerial vehicle that damps oscillation of a payload that is slung from the aerial vehicle, the aerial vehicle comprising:
   a body having lift elements;
   a payload attachment configured to attach the payload, the payload coupled to the payload attachment; and
   a controller configured to:
      measure an angle of the payload relative to the body;
      implement a forward control path that controls the orientation of the body;
      implement a feedback function that processes the angle of the payload and, responsive to the angle of the payload being greater than a range of three to five degrees, adjust an orientation of the body in a direction of the angle of the payload; and
      responsive to the angle of the payload being less than the range of three to five degrees, create a null-control zone wherein no adjustment to the orientation of the body is made.

7. The aerial vehicle of claim 6, wherein the feedback function comprises a proportional gain function and a derivative function that acts on the angle of the payload.

8. The aerial vehicle of claim 6, wherein the feedback function further comprises a second non-linear function that implements a relay function when developing the adjustment command.

9. The aerial vehicle of claim 8, wherein the adjustment command includes a pitch angle adjustment and a roll angle adjustment.

10. The aerial vehicle of claim 6, wherein the lift elements include rotors mounted in a plane parallel to or coincident with a long dimension of the body.

11. A quadrotor configured to automatically compensate for changes in an angle of a payload that is slung from the quadrotor comprising:
    four lift rotors;
    a body coupling the four lift rotors;
    a payload attachment; and
    a controller configured to:
       measure the angle of the payload relative to a plane through the four lift rotors;
       when a threshold condition is present, generate an adjustment command responsive to the angle of the payload; and
       apply the adjustment command to an input control signal to cause the quadrotor to accelerate in a direction of the angle of the payload, wherein the controller is further configured to cap the adjustment command to a value corresponding to a saturation threshold angle when the angle of the payload exceeds the saturation threshold angle.

12. The quadrotor of claim 11, wherein the threshold condition is the angle of the payload being greater than a predetermined minimum angle of the payload wherein when the threshold condition is not present, setting the adjustment command to null so that no change is made to the input control signal.

13. The quadrotor of claim 11, wherein generating the adjustment command comprises processing the angle of the payload using a feedback function with a proportional gain function and a derivative gain function to provide an intermediate result.

14. The quadrotor of claim 13, wherein generating the adjustment command further comprises processing the intermediate result to remove values below a threshold value.

15. The quadrotor of claim 13, where applying the adjustment command to the input control signal comprises adding a pitch correction signal to a pitch input signal and a roll correction signal to a roll input signal.

16. The quadrotor of claim 11, wherein the controller is further configured to apply the adjustment command to the input control signal in addition to pilot commands received from a ground station.

* * * * *